A. McKELLAR.
VISIBLE MEASURE DISPENSING APPARATUS.
APPLICATION FILED NOV. 26, 1917.
1,305,139.
Patented May 27, 1919.
2 SHEETS—SHEET 1.
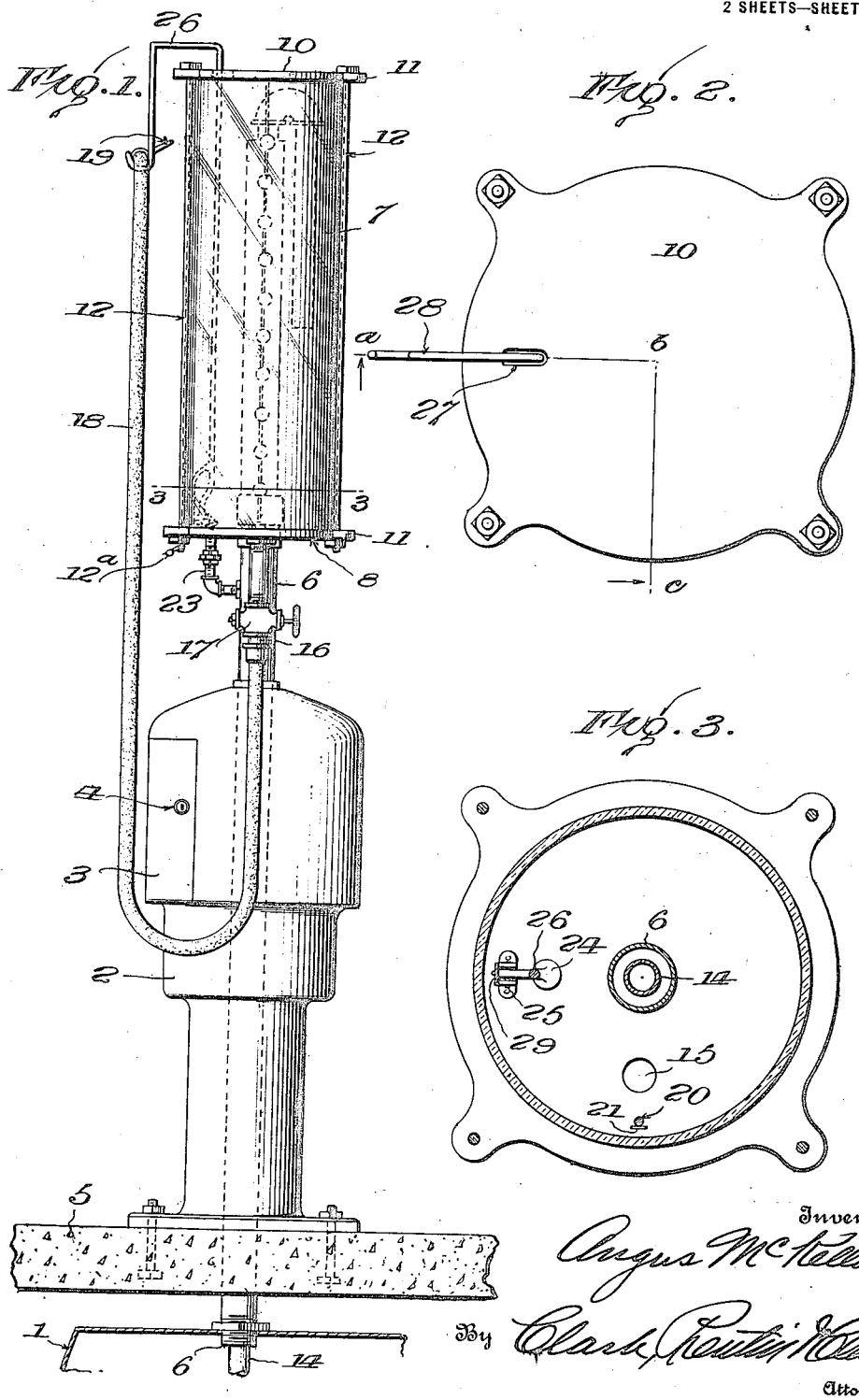

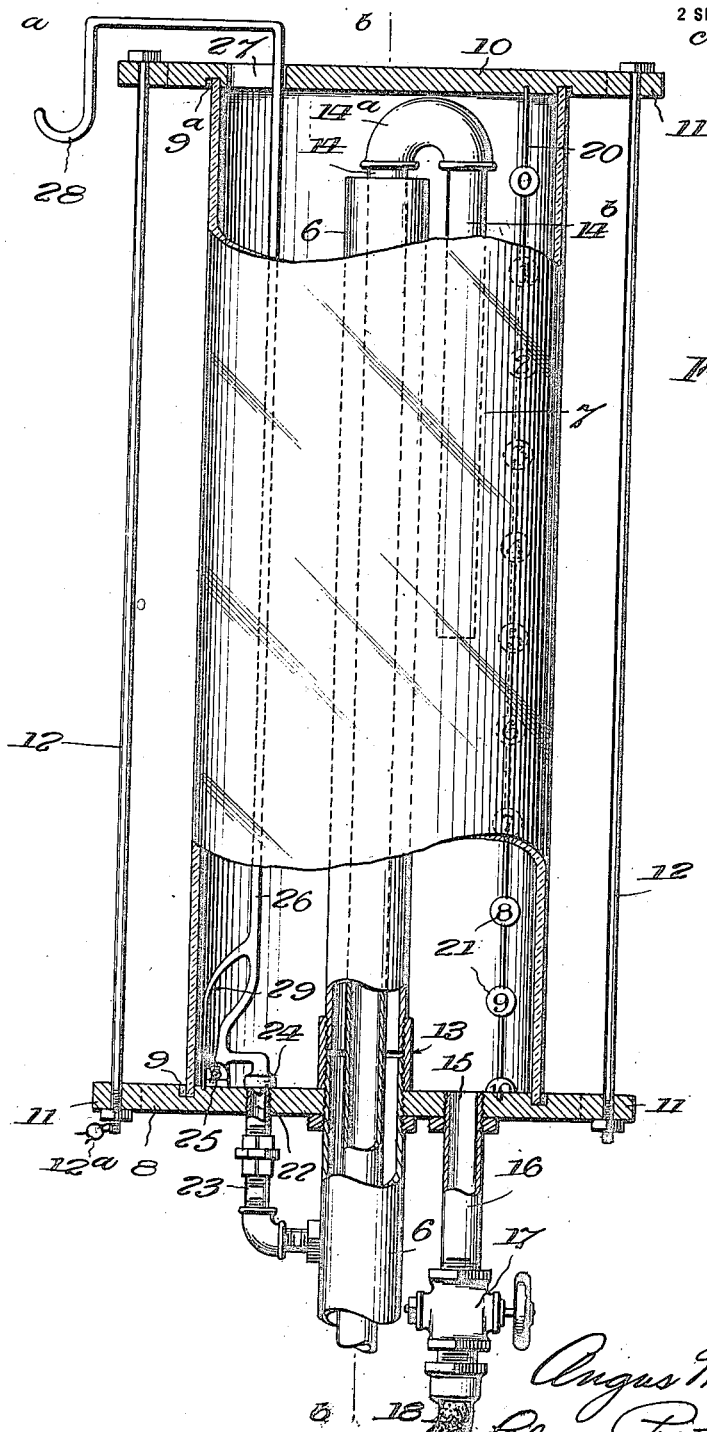

UNITED STATES PATENT OFFICE.

ANGUS McKELLAR, OF SALT LAKE CITY, UTAH.

VISIBLE-MEASURE DISPENSING APPARATUS.

1,305,139.  Specification of Letters Patent.  Patented May 27, 1919.

Application filed November 26, 1917. Serial No. 204,080.

*To all whom it may concern:*

Be it known that I, ANGUS McKELLAR, a citizen of the United States, residing at Salt Lake City, in the county of Salt Lake and State of Utah, have invented new and useful Improvements in Visible-Measure Dispensing Apparatus, of which the following is a specification.

This invention relates to liquid dispensing apparatus and pertains particularly to dispensing apparatus for the dispensing of gasolene and motor fuel.

The invention has for its object the provision of a measuring dispensing apparatus having a transparent calibrated receptacle adapted to receive fluid from a pump, and which is adapted to empty the required amount and to return the unused amount into the storage tank.

A further object of the invention is to provide a visible measuring and dispensing apparatus in which a drain valve communicating with a storage tank and within a transparent receptacle is adapted to remain closed until actuated by the operator or until a dispensing hose is hung on a valve handle.

The invention provides other novel combinations of a storage tank, a pump, and a transparent dispensing receptacle and particular pipe connections and valves between these parts. The apparatus is designed so as to provide a visible measuring and liquid dispensing machine so constructed that both seller and purchaser can at all times see the flow of liquid from the pump to the dispensing receptacle and from the latter to the vessel or automobile tank which is to be filled. The dispensing receptacle is graduated to conform to actual measurements and the graduations may be verified by the proper official acting as sealer of weights and measures. The liquid can be withdrawn from the dispensing receptacle only through the dispensing hose or by the automatic drain valve which latter is within the receptacle and in plain view. If the seller were to manipulate the control handle which projects from the automatic drain valve this movement could easily be detected by the purchaser.

The above and other features of the invention are described and claimed in the following specification and claims and illustrated in the accompanying drawings, in which—

Figure 1 is an elevation showing the visible dispensing receptacle mounted above the pump of a filling station. A tank is shown beneath the pump and the supply pipe and automatic drain valve are illustrated in dotted lines within the dispensing receptacle.

Fig. 2 represents a top plan view enlarged looking downward on the filling station and showing the valve handle projecting from the top of the dispensing receptacle.

Fig. 3 represents a section through the dispensing receptacle taken on the line 3—3 of Fig. 1 and looking downwardly.

Fig. 4 represents in partial section an enlarged elevation of the dispensing receptacle showing the relation of the drain valve to the overflow pipe. This view is taken on the lines *a—b* and *b—c* of Fig. 2.

Referring in detail to the apparatus, a storage tank is indicated by 1 and immediately above the same is a pump member 2, which is illustrated as one of the usual forms of dispensing station constructions. This pump member is provided with a convenient door 3 having a lock of any suitable type indicated at 4. The pump is mounted on suitable supporting structure indicated by the concrete base 5 above the storage tank 1. Extending upwardly from the pump 2 is a combined support member and pipe 6 which provides a support for the dispensing receptacle mounted at its upper end. This receptacle is preferably cylindrical in shape and is formed of heavy transparent glass 7. The lower end of the glass cylinder is supported on a cast iron base 8 which is rigidly secured to the supporting pipe 6. The cylinder 7 is sunk into an annular depression 9 in the base 8 and is packed with suitable material to prevent the escape of the liquids from the dispensing receptacle. Where gasolene or oil is to be dispensed it has been found convenient to use a combination of cement and shellac to prevent the seepage of the material from the lower end of the glass cylinder. The upper end of the cylinder 7 is covered by cast iron covering plate 10 which is similar to the base plate 8 and which has a corresponding annular groove or depression $9^a$ to correspond with the depression 9 of the base plate 8.

The plates 8 and 10 are provided with extensions 11 adapted to receive fastening rods 12 which extend from the base plate 8 to the top plate 10 and are adapted to be tightly fastened to clamp the glass cylinder 7 between the same.

Referring in detail to the pipe connections and the valve for operating and controlling the same, it will be observed that the supporting pipe 6 constitutes an overflow pipe which projects upwardly through the base plate 8 and terminates within the glass cylinder 7 at a point near the top thereof which may be predetermined according to the measurement by the proper official. As indicated in detail in Fig. 4 this overflow pipe 6 may be formed of two parts having a screw-threaded connection with a clamping member 13. Movement of the upper end of the pipe in the screw-threads will raise or lower the upper end of the pipe as desired. The pipe 6 projects downwardly through the pump member 2 and terminates within the storage tank as indicated in Fig. 1. The supply pipe 14 extends from the supply tank 1 upwardly through the pipe 6 and projects from the upper end of the pipe 6 and beyond the upper rim thereof so that liquid drawn from the tank and discharged into the receptacle 7 will be delivered into the receptacle without any portion of the liquid dropping into the upper open end of the pipe 6. As shown the delivery end of the supply pipe 14 is provided with a return bend 14$^a$ which projects over the rim of the pipe 6, and a downwardly projecting part 14$^b$ which extends sufficiently far down into the receptacle to prevent splashing and waste of the liquid when the receptacle is being filled. The supply pipe 14 does not fill the bore of the overflow pipe 6 and there is ample room for the passage of liquid which may overflow into the pipe 6. A discharge dispensing outlet is indicated in the bottom of the filling receptacle at 15 and a pipe 16 is connected to this discharge outlet and is provided with a valve 17 adapted to control same. The usual flexible dispensing hose member is fastened to the lower end of the pipe 16 and is indicated by the numeral 18. At the extreme end of the hose member 18 from the pipe 16 is the usual delivery nozzle 19, which when not in use is adapted to hang on the valve handle as will be described.

As illustrated in Fig. 4 the filling receptacle is designed to contain ten gallons of gasolene or other liquid which is to be dispensed. A rod 20 is fastened in said receptacle and held at its upper and lower ends by the plates 10 and 8 respectively. Along this rod are the number plates 21 which are provided with the numbers from 0 to 10 arranged with the 0 number at the top and on a line with the top rim of the overflow pipe 6. The positions of these indicating numbers 21 may be determined by the official sealer of weights and measures when the machine is being inspected.

One of the important features of the invention is to be found in the drain pipe for the receptacle which is provided with a drain opening 22 formed in the base plate of the apparatus. A drain pipe 23 is secured into the opening 22 and projects from the lower side of the base plate 8 and is secured into the return pipe 6 at a point below the base plate 8, so that liquid drawn off from the bottom of the dispensing receptacle is led into the pipe 6 and may find its way downward into the storage tank 1. An automatic drain valve 24 is provided within the glass cylinder 7 and is adapted to normally close the opening 22. This valve member is pivoted at one side of the opening as indicated at 25 and is adapted to be rocked by means of a control handle 26 which extends upwardly and projects from the top of the dispensing receptacle through an opening 27 in the top plate 10. The control handle 26 extends to one side of the plate 10 and is provided with the hook-shaped end 28 constituting supporting means for the end of the dispensing hose 18 and the nozzle 19. A spring member 29 is provided within the receptacle and is mounted to exercise a constant pressure against the rod or valve handle 26 to normally hold the valve 24 in the closed position, that is closing the opening 22. The weight of the hose 18 when hung on the hook 28 is sufficient to move the valve handle 26 and rock the valve 24 on the pivot 25 and permit any liquid within the receptacle to pass into the pipe 23 and enter the return pipe 6.

In the operation of the apparatus, when the liquid is discharged into the glass cylinder 7 through the pipe 14$^b$, it may not be withdrawn from the cylinder except through the dispensing hose 18 unless the operator of the machine opens the automatic drain valve 24, which action would be visible to the purchaser. In addition to the advantage that the apparatus provides in making it difficult for a salesman to provide a purchaser with short measure, the apparatus provides means for draining the dispensing receptacle each time that the apparatus is used. When the required quantity is drawn off, the hose 18 is hung on the hook 28, the valve handle 26 is moved to the left in the slotted opening 27, the automatic drain valve 24 is raised, and the liquid which is left in the dispensing cylinder 7 is allowed to return through the pipe 23 and through the return pipe 6 to the storage tank 1.

In addition to the above features, the present apparatus provides an improvement over the ordinary dispensing pump station which are acknowledged to be faulty in that short measure is quite ordinarily provided because of worn pump parts and the resultant leakage.

Changes in material and size and shape of the parts, as well as changes in the relative positions of the receptacle, pump, and storage tank, may be made without departing from the scope of the invention.

What I claim is:—

1. In a liquid dispensing apparatus, a dispensing receptacle, a dispensing outlet and hose therefor, an overflow return connection leading from an upper predetermined point in said receptacle, a drain connection leading from the lower part of said receptacle and communicating with said return connection, a control valve for said drain connection, a spring for holding said valve in the closed position, a valve handle connected to said valve and constituting supporting means for the end of said hose, the weight of said hose when resting on said handle acting to hold said drain valve in the open position.

2. In a liquid dispensing apparatus, a dispensing receptacle, a dispensing outlet and hose therefor, an overflow return connection leading from an upper predetermined point in said receptacle, a drain connection leading from the lower part of said receptacle and communicating with said return connection, a control valve for said drain connection, a valve handle connected to said valve and constituting supporting means for the delivery end of said hose, the weight of said hose when on said handle acting to hold said drain valve in the open position.

3. In a fluid dispensing apparatus, a dispensing receptacle, a dispensing outlet and hose therefor, an overflow return connection comprising an upright pipe member extending through the lower part of said receptacle and terminating with its upper end open and at a predetermined point in said receptacle, a supply pipe extending upwardly through said upright pipe member and projecting laterally beyond the rim thereof, a drain connection leading from the lower part of said receptacle and communicating with said return connection, and a control valve for said drain connection.

4. In a liquid dispensing apparatus, the combination of a storage tank, a pump connected to said tank, a dispensing receptacle connected to said tank and to said pump, a dispensing outlet and hose for said receptacle, an overflow return connection comprising an upright pipe member extending through the lower part of said receptacle and terminating with its upper end open and at a predetermined point in said receptacle and with its lower end in communication with said tank, a supply pipe extending upwardly from said tank through said upright pipe member and projecting laterally beyond the upper rim thereof, a drain connection leading from the lower part of said receptacle and communicating with said storage tank, and a control valve for said drain connection located within said receptacle.

5. In a liquid dispensing apparatus, a supply reservoir, a measuring tank, a pump operatively connected to the reservoir and the tank, an over-flow pipe connecting said tank to the reservoir, a drain pipe connecting the over-flow pipe to said tank, a valve in the drain pipe, an outlet pipe connected to the tank, a dispensing hose connected to the outlet pipe having a discharge nozzle, and means operatively connected to the drain valve with which said nozzle is adapted to be detachably engaged, whereby said valve is opened to drain the surplus liquid from the tank into the reservoir.

6. In a liquid dispending apparatus, a supply reservoir, a measuring tank, a pump operatively connected to the reservoir and the tank, an overflow pipe connecting said tank to the reservoir, a drain pipe connecting the overflow pipe to said tank, a valve in the drain pipe, an outlet pipe connected to the tank, a dispensing hose connected to the outlet pipe having a discharge nozzle, a pivotally mounted lever, means operatively connecting one end of the lever to said drain valve, whereby the valve is closed by the movement of said lever in one direction, and means on the other end of said lever to detachably receive the hose nozzle, whereby the lever is moved in the opposite direction to open the drain valve and return the surplus liquid from the tank to the reservoir.

7. In a liquid dispensing apparatus, a transparent dispensing receptacle, a dispensing outlet and hose therefor, an overflow return connection leading from an upper predetermined point in said receptacle, a drain connection leading from the lower part of said receptacle and communicating with said return connection, a control valve for said drain connection located within said receptacle and visible from the exterior thereof, and adjusting means for operating said control valve connected to the same and extending to the exterior of the receptacle.

8. In a fluid dispensing apparatus, a transparent dispensing receptacle, a dispensing outlet and hose therefor, an overflow return connection comprising an upright pipe member extending through the lower part of said receptacle and terminating with its upper end open and at a predetermined point in said receptacle, a drain connection leading from the lower part of said receptacle and communicating with said return connection, and a control valve within said receptacle for said drain connection and visible from the exterior thereof.

9. In a liquid dispensing apparatus, a transparent dispensing receptacle, a dispensing outlet and hose therefor, an overflow return connection leading from an upper predetermined point in said receptacle, a drain connection leading from the lower part of said receptacle and communicating with said return connection, a control valve within said receptacle for said drain connection, a spring for holding said valve in the closed position, and a valve handle connected to said valve and projecting from said valve, through the top of said receptacle to the exterior thereof.

10. In a liquid dispensing apparatus, the combination of a storage tank, a pump connected to said tank, a transparent dispensing receptacle connected to said tank and to said pump, a dispensing outlet and hose for said dispensing receptacle, an overflow return connection leading from an upper predetermined point in said receptacle, a drain connection leading from the lower part of said receptacle and communicating with said return connection, and a control valve located within said receptacle for said drain connection and visible from the exterior thereof.

In testimony whereof I affix my signature.

ANGUS McKELLAR.